US008442507B2

(12) United States Patent
Duggal et al.

(10) Patent No.: US 8,442,507 B2
(45) Date of Patent: May 14, 2013

(54) METHODS AND APPARATUS FOR DYNAMIC SOURCE DETERMINATION OF PROVISIONING INFORMATION ON A PER-NETWORK SERVICE BASIS FOR OPEN MARKET WIRELESS DEVICES

(75) Inventors: Nakul Duggal, San Diego, CA (US); Hai Qu, San Diego, CA (US); Bryan Gurganus, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 606 days.

(21) Appl. No.: 12/185,298

(22) Filed: Aug. 4, 2008

(65) Prior Publication Data

US 2010/0035595 A1     Feb. 11, 2010

Related U.S. Application Data

(60) Provisional application No. 60/975,405, filed on Sep. 26, 2007.

(51) Int. Cl.
*H04M 3/00*     (2006.01)
*H04B 1/38*     (2006.01)

(52) U.S. Cl.
USPC .......................................... 455/418; 455/558

(58) Field of Classification Search .......... 455/418–420, 455/557–559, 410–411, 414.1, 423–425, 455/435.1, 435.2, 550.1, 552.1, 466, 406–408
See application file for complete search history.

(56) References Cited

U.S. PATENT DOCUMENTS

| 5,675,628 | A | 10/1997 | Hokkanen |
| 6,557,753 | B1 | 5/2003 | Beaujard et al. |
| 6,584,326 | B1 | 6/2003 | Boydston et al. |
| 6,725,056 | B1 | 4/2004 | Moles et al. |
| 6,801,528 | B2 | 10/2004 | Nassar |

(Continued)

FOREIGN PATENT DOCUMENTS

| CN | 1864429 A | 11/2006 |
| CN | 1969527 A | 5/2007 |

(Continued)

OTHER PUBLICATIONS

International Search Report and Written Opinion—PCT/US2008/085444, International Search Authority—European Patent Office—Apr. 24, 2009.

(Continued)

*Primary Examiner* — Brandon Miller
(74) *Attorney, Agent, or Firm* — Abdollah Katbab

(57) ABSTRACT

Systems, apparatus and methods are described that provide for dynamic source determination of provisioning information on a per-network service basis for open market wireless devices. Specifically, systems, apparatus and methods provide for the open market wireless devices and/or the users of such devices to acquire provisioning information for network services in instances in which neither the removable module currently associated with the device or the non-removable memory of the open market wireless device store the provisioning information for the desired network service. In this regard, present aspects provide for a prompt, such as a user notification to presented on an output mechanism of the wireless device when the wireless determines first that the provisioning information is not stored on the removable module and, secondly, that the provisioning information is not stored on the non-removable data storage of the device.

31 Claims, 5 Drawing Sheets

U.S. PATENT DOCUMENTS

| | | |
|---|---|---|
| 6,829,593 B1 | 12/2004 | Ritter et al. |
| 6,845,153 B2 | 1/2005 | Tiburtius et al. |
| 6,916,546 B2 | 7/2005 | Schoennenbeck et al. |
| 6,944,150 B1 | 9/2005 | McConnell et al. |
| 7,149,293 B1 | 12/2006 | Coppage et al. |
| 7,149,545 B2 | 12/2006 | Hurst et al. |
| 7,292,855 B2 | 11/2007 | Kumar et al. |
| 7,353,017 B2 | 4/2008 | Chen et al. |
| 7,366,780 B2 | 4/2008 | Keller et al. |
| 7,389,119 B2 | 6/2008 | Weigele |
| 7,613,479 B2 | 11/2009 | Twigg et al. |
| 7,792,759 B2 | 9/2010 | Sahota et al. |
| 7,826,842 B2 | 11/2010 | Buckley et al. |
| 2002/0188736 A1 | 12/2002 | Jarvensivu |
| 2003/0125023 A1 | 7/2003 | Fishler |
| 2003/0186722 A1 | 10/2003 | Weiner |
| 2003/0211840 A1 | 11/2003 | Castrogiovanni et al. |
| 2003/0211861 A1 | 11/2003 | Castrogiovanni et al. |
| 2003/0220101 A1 | 11/2003 | Castrogiovanni et al. |
| 2004/0043788 A1 | 3/2004 | Mittal |
| 2004/0075675 A1 | 4/2004 | Raivisto et al. |
| 2004/0192306 A1 | 9/2004 | Elkarat et al. |
| 2004/0192386 A1 | 9/2004 | Aerrabotu et al. |
| 2004/0203737 A1 | 10/2004 | Myhre et al. |
| 2004/0204051 A1 | 10/2004 | Scott et al. |
| 2004/0204087 A1 | 10/2004 | Carlsson |
| 2004/0204089 A1 | 10/2004 | Castrogiovanni et al. |
| 2004/0228356 A1 | 11/2004 | Adamczyk et al. |
| 2004/0230677 A1 | 11/2004 | Ohara |
| 2005/0020308 A1 | 1/2005 | Lai |
| 2005/0064862 A1 | 3/2005 | Castrogiovanni et al. |
| 2005/0071423 A1 | 3/2005 | Rajaniemi |
| 2005/0071459 A1 | 3/2005 | Costa-Requena et al. |
| 2005/0085244 A1* | 4/2005 | Choi et al. .................. 455/466 |
| 2005/0147127 A1 | 7/2005 | Putcha et al. |
| 2005/0153741 A1 | 7/2005 | Chen et al. |
| 2005/0174937 A1 | 8/2005 | Scoggins et al. |
| 2005/0184163 A1 | 8/2005 | De Jong |
| 2005/0184164 A1 | 8/2005 | De Jong |
| 2005/0184165 A1 | 8/2005 | De Jong |
| 2005/0188360 A1 | 8/2005 | De Jong |
| 2005/0239504 A1 | 10/2005 | Ishii et al. |
| 2006/0059125 A1 | 3/2006 | Yan |
| 2006/0099600 A1 | 5/2006 | McIntire |
| 2006/0126590 A1 | 6/2006 | Putcha et al. |
| 2006/0141987 A1 | 6/2006 | De Groot |
| 2006/0143098 A1 | 6/2006 | Lazaridis |
| 2006/0172734 A1* | 8/2006 | Tak ............................ 455/433 |
| 2006/0195593 A1 | 8/2006 | Shiraki et al. |
| 2006/0217113 A1 | 9/2006 | Rao et al. |
| 2006/0234760 A1 | 10/2006 | Cheng |
| 2006/0258341 A1 | 11/2006 | Miller et al. |
| 2006/0262736 A1 | 11/2006 | Dong et al. |
| 2006/0270453 A1 | 11/2006 | Di Giorgio et al. |
| 2007/0115950 A1* | 5/2007 | Karaoguz et al. ............ 370/356 |
| 2007/0177562 A1 | 8/2007 | Castrogiovanni et al. |
| 2007/0186107 A1 | 8/2007 | Sonetaka |
| 2007/0202749 A1 | 8/2007 | Bhat et al. |
| 2007/0218871 A1 | 9/2007 | Bonner |
| 2007/0224969 A1 | 9/2007 | Rao |
| 2007/0232354 A1 | 10/2007 | Moscovitz et al. |
| 2007/0245008 A1 | 10/2007 | Matsui et al. |
| 2007/0293192 A9 | 12/2007 | De Groot |
| 2008/0014956 A1 | 1/2008 | Balasubramanian |
| 2008/0014984 A1 | 1/2008 | Brown et al. |
| 2008/0034425 A1 | 2/2008 | Overcash et al. |
| 2008/0049662 A1 | 2/2008 | Islam et al. |
| 2008/0057957 A1 | 3/2008 | Altbaum et al. |
| 2008/0108333 A1 | 5/2008 | Jemison et al. |
| 2008/0146280 A1 | 6/2008 | Sasse et al. |
| 2008/0161050 A1 | 7/2008 | Shudark et al. |
| 2009/0061833 A1 | 3/2009 | Ho et al. |
| 2009/0081996 A1 | 3/2009 | Duggal et al. |
| 2009/0082004 A1 | 3/2009 | Duggal et al. |
| 2009/0082029 A1 | 3/2009 | Holcman et al. |

FOREIGN PATENT DOCUMENTS

| | | |
|---|---|---|
| EP | 1265397 A2 | 12/2002 |
| EP | 1411712 | 4/2004 |
| EP | 1519600 A2 | 3/2005 |
| EP | 1050175 B1 | 4/2005 |
| EP | 1564960 A1 | 8/2005 |
| JP | 3056082 B2 | 6/2000 |
| JP | 2001134688 A | 5/2001 |
| JP | 2001224062 A | 8/2001 |
| JP | 2004153461 A | 5/2004 |
| JP | 2005537715 A | 12/2005 |
| JP | 2006174158 A | 6/2006 |
| JP | 2007506370 A | 3/2007 |
| RU | 2169437 | 6/2001 |
| RU | 2000115584 A | 6/2002 |
| RU | 2196393 C2 | 1/2003 |
| RU | 2005115091 A | 11/2005 |
| WO | 2004021590 | 3/2004 |
| WO | WO2004036941 | 4/2004 |
| WO | WO2005029748 A2 | 3/2005 |
| WO | WO2005036916 A1 | 4/2005 |
| WO | WO2005053348 | 6/2005 |
| WO | WO2005103919 A1 | 11/2005 |
| WO | WO2006109155 A2 | 10/2006 |
| WO | WO2007081727 | 7/2007 |

OTHER PUBLICATIONS

Taiwan Search Report—TW097147210—TIPO—May 2, 2012.

* cited by examiner

METHODS AND APPARATUS FOR DYNAMIC SOURCE DETERMINATION OF PROVISIONING INFORMATION ON A PER-NETWORK SERVICE BASIS FOR OPEN MARKET WIRELESS DEVICES

CLAIM OF PRIORITY UNDER 35 U.S.C. §119

The present Application for Patent claims priority to Provisional Application No. 60/975,405, entitled, "Apparatus and Methods Associated with Open Market Handsets," filed on 26 Sep. 2007 and assigned to the assignee hereof and hereby expressly incorporated by reference herein.

CROSS-REFERENCE TO RELATED APPLICATIONS

The present application is related to U.S. patent application Ser. No. 12/185,321, entitled "Apparatus and Methods for Network Identification of Open Market Wireless Devices"; U.S. patent application Ser. No. 12/185,344, entitled "Methods and Apparatus for Application Network-Server Determination for Removable Module-Based Wireless Devices"; U.S. patent application Ser. No. 12/185,283, entitled "Systems and Methods for Provisioning Wireless Devices Based on Multiple Network-Service Application Profiles and Data Session Conflict Resolution,". These applications have been filed concurrently herewith the present application and are assigned to the same assignee as the present invention. These applications are hereby incorporated by reference as if set forth fully herein.

BACKGROUND

1. Field

The present aspects relate to wireless communication devices, and more particularly, to apparatus and methods associated with providing network service provisioning information to open market wireless devices.

2. Background

A wireless communication device, otherwise referred to as a handset, is utilized to communicate with another handset or a landline phone via a wireless communication network. In order to establish a connection with the wireless communication network, the handset must have a relationship with an operator or service provider to allow access to the wireless communication network and to manage billing the user of the handset for the use of the wireless communication network. In a closed market system, the operator maintains a degree of control over the distribution and sale of handsets operable on the wireless communication network of the operator. For example, the operator may distribute and sell the handsets itself, or authorize a third party to perform this task, where the respective closed market handsets are authorized and provisioned by the operator to work on the wireless communication network of the operator. Thus, a closed market handset is limited for use in a specific wireless communication network corresponding to the respective operator.

In contrast to the closed market system, an open market system allows a handset to be distributed and sold for use on any of a plurality of wireless communication networks each corresponding to a respective one of a plurality of different operators. In the open market system, a user must obtain a user identity module, such as a smart card, from one of the plurality of different operators, where the user identity module includes a key or other authorization mechanism allowing operation on one of the plurality of wireless communication networks. The user may then insert a removable module that includes user identity information into the open market handset, thereby enabling the open market handset to communicate with the respective wireless communication network associated with the operator that authorized the removable module. For example, a removable module may be referred to as a Removable User Identity Module (RUIM) for a Code Division Multiple Access (CDMA) system, a CDMA Subscriber Identity Module (CSIM) based on a Universal Integrated Circuit Card (UICC) for a CDMA system, Universal Subscriber Identity Module (USIM) based on a UICC for Universal Mobile Telecommunications System (UMTS), or a Subscriber Identity Module (SIM) in a Global System for Mobile communications (GSM) system. For the sake of brevity the term removable module is used herein throughout to refer to any module that may be inserted or otherwise is communication with a wireless device that provides for storage of data, such as user identity information.

In addition to providing access and authorization to communicate over a network operator's wireless communication network, the removable module may be configured by the network operator with provisioning information for one or more network services. For example, provisioning information may be provided for on the removable module for a download service. One example of a download service is Binary Runtime Environment for Wireless® (BREW®) download services, available from Qualcomm Incorporated of San Diego, Calif.

However, a problem exists in the open market scenario if neither the removable module nor the open market wireless device is configured with provisioning information for a network service that a user desires to access. For example, a network operator may deploy removable modules into the open marketplace, which may not be configured for an emerging service, such as, for example, Multimedia Messaging Service (MMS), because at the time of deployment the network operator did not offer this service. After the removable modules are deployed in the marketplace (i.e., being used by subscribers in open market devices), the network operator subsequently begins offering the service. Since the deployed removable modules are not configured with the requisite provisioning information, the subscribers may not be able to access the service unless the open market device memory stores the requisite provisioning information or the subscriber replaces the removable module with an updated removable module that includes the necessary provisioning information. In many, if not most, instances if the service is a relatively new service, the wireless device may not be configured with the requisite provisioning information for the network service.

Since many network operators may not have over-the-air provisioning capability to add or otherwise change provisioning information on the deployed removable module s, the subscriber's only options may be to replace the removable module with an updated removable module that includes the necessary provisioning information for the newly offered network service or return the removable module to the network operator for provisioning information updating. However, replacing the removable module with an updated removable module or returning the removable module for updating is an inefficient process and, in many emerging markets in which the use of open market wireless devices is prevalent, not a viable option.

Therefore, a need exists to provide the user of an open market wireless device the ability to acquire provisioning information for a network service in instances in which the provisioning information is not currently available on the removable module or the open market wireless device. The desired process should provide for obtaining the provisioning information without having to replace the removable module with an updated removable module or otherwise return the removable module to the source for re-configuration.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present aspects define systems, apparatus and methods that provide for dynamic source determination of provisioning information on a per-network service basis for open market wireless devices. Specifically, systems, apparatus and methods provide for the open market wireless devices and/or the users of such devices to acquire provisioning information for network services in instances in which neither the removable module, such as a RUIM, SIM, USIM, CSIM or the like, currently associated with the device or the non-removable memory of the open market wireless device store the provisioning information for the desired network service. In this regard, present aspects provide for a prompt, such as a user notification to be presented on an output mechanism of the wireless device when the wireless device determines first that the provisioning information is not stored on the removable module and, secondly, that the provisioning information is not stored on the non-removable data storage of the device. In one aspect, the user notification may provide instructions for obtaining the provisioning information and manually entering (i.e., storing) the provisioning information on the wireless device. In another aspect, the user notification may provide instructions for obtaining and storing the provisioning automatically via the wireless communication network, such as downloading the provisioning information from a network server or the like.

As such, present systems, apparatus and methods provide for provisioning information to be obtained and stored on the wireless device without requiring the user to obtain a new removable module or update the existing removable module. In this regard, in instances in which network operators have no ability to provision the removable modules over-the-air, the network operator may introduce new services into the wireless marketplace without requiring that the user replace or update their existing removable module. Thus, present aspects provide for an efficient means for providing provisioning information to open market wireless devices desiring immediate access to network services associated with the provisioning information.

One aspect is provided for by a method of dynamic source determination of provisioning information on an open market wireless communication device. The method includes receiving a first input to launch a network service on an open market wireless communication device. The method further includes determining if provisioning information corresponding to the network service is stored on a removable module in communication with the wireless communication device and, if the provisioning information is determined to be not stored on the removable module, determining if provisioning information corresponding to the network service is stored on a non-removable data storage of the wireless communication device. The method also includes if the provisioning information is determined to be not stored on the removable module and the non-removable data storage, generating a user notification for output on the wireless communication device. The user notification includes instructions for configuring the provisioning information on the wireless communication device.

In one aspect of the method the user notification is generated and includes instructions for obtaining provisioning information that is to be manually entered on the wireless communication device. For example, the generated user notification may include an address for an Internet-based webpage that publishes provisioning information to be manually entered on the wireless communication device. On alternate aspects of the method the user notification is generated and includes instructions for obtaining the provisioning information via wireless network delivery. In such aspects, in which the user notification includes a link to download the provisioning information or a link to search for a network server that stores the provisioning information, the method may include receiving a second input to initiate the wireless network delivery of the provisional information based on the instructions included in the user notification.

Further aspects of the method may provide for receiving the provisioning information based on the instructions and storing the provisional information in at least one of the removable module or the non-removable data storage. The further aspect may additionally include receiving a second input to launch the network service on the wireless communication device and launching the network service on the wireless communication device in response to the second input. In such aspects, receiving the second input may further provide for checking for a service provisioning indicator corresponding to the network service, prior to determining if the provisioning information corresponding to the service is stored on the removable module. The service provisioning indicator indicates that the provisioning information is not stored on the non-removable data storage. The method, thus, may additionally include retrieving the provisional information from the non-removable data storage if the service provisioning indicator is detected and launching the network service on the wireless communication device according to the provisioning information retrieved from the non-removable data storage.

At least one processor configured to provide source determination of provisioning information on an open market wireless communication device defines a further aspect of the innovation. The processor includes a first module for receiving a first input to launch a network service on an open market wireless communication device. The processor additionally includes a second module for determining if provisioning information corresponding to the network service is stored on the removable module in communication with the wireless communication device or, if the provisioning information is determined to be not stored on the removable module, determining if provisioning information corresponding to the network service is stored on a non-removable data storage of the wireless communication device. The processor also includes a third module for generating a user notification for output on the wireless communication device, wherein the user notification includes instructions for configuring the provisioning information on the wireless communication device, if the provisioning information is determined to be not stored on the removable module the non-removable data storage.

Another related aspect is provided for by a computer program product that includes a computer-readable medium. The medium includes a first set of codes for causing a computer to receive a first input to launch a network service on an open market wireless communication device. The medium additionally includes a second set of codes for causing the computer to determine if provisioning information corresponding to the network service is stored on a removable module in communication with the wireless communication device or, if the provisioning information is determined to be not stored on the removable module, determining if provisioning information corresponding to the network service is stored on a non-removable data storage of the wireless communication device. The medium also includes a third set of codes for causing the computer to generate a user notification for output on the wireless communication device, wherein the user notification includes instructions for configuring the provisioning information on the wireless communication device, if the provisioning information is determined to be not stored on the removable module and the non-removable data storage.

An apparatus for source determination of provisioning information on a wireless communication device defines yet another related aspect. The apparatus includes means for receiving a first input to launch a network service on an open market wireless communication device. The apparatus additional includes means for determining if provisioning information corresponding to the network service is stored on a removable module in communication with the wireless communication device or if the provisioning information is determined to be not stored on the removable module, determining if provisioning information corresponding to the network service is stored on a non-removable data storage of the wireless communication device. Also, the apparatus includes means for generating a user notification for output on the wireless communication device, wherein the user notification includes instructions for configuring the provisioning information on the wireless communication device, if the provisioning information is determined to be not stored on the removable module and the non-removable data storage.

Additionally, a further aspect is defined by an open market wireless communication device. The device includes a computer platform including a processor and non-removable memory in communication with the processor. The non-removable memory includes one or more network service clients executable by the processor. The device additionally includes a removable module in removable communication with the processor and operable to store data. Additionally, the device includes a first user interface in communication with the processor and operable to receive a first input to launch one of the network service clients on the open market wireless communication device. Further, the device includes provisioning source determination logic stored in the data storage and executable by the processor. The provisioning source determination logic is responsive to the first input to determine if provisioning information corresponding to the network service is stored on the removable module or, if the provisioning information is determined to be not stored on the removable module, determining if provisioning information corresponding to the network service is stored on the non-removable data storage of the wireless communication device. The device additionally includes a provisioning instruction notification generator stored in the data storage and executable by the processor. The provisioning instruction notification generator is operable to generate a user notification for output on the wireless communication device, in response to the logic determining that the provisioning information is not stored on the removable module or the data storage. The user notification includes instructions for configuring the provisioning information on the wireless communication device.

In some aspects of the device, the provisioning instruction notification generator may be further operable to generate the user notification that includes instructions for obtaining the provisioning information that is to be manually entered on the wireless communication device. For example, the user notification may include an address for an Internet-based webpage that publishes the provisioning information. As such, the open market wireless device may additionally include a second user interface in communication with the processor and operable to receive a second input to manually enter the provisioning information into either the non-removable data storage or the removable module based on the instructions in the user notification. In an alternate aspect, the provisioning instruction notification generator includes instructions for obtaining the provisioning information via wireless network delivery. For example, the notification may include a link that is operable to be activated to downloading the provisioning information.

In alternate aspects of the device, the provisioning source determination logic may be further operable to check for a service provisioning indicator corresponding to to the service is stored on the removable module and retrieve the provisional information from the non-removable data storage if the service provisioning indicator is detected. The service provisioning indicator indicates that the provisioning information is stored on the non-removable data storage.

Thus, presently described methods, systems and apparatus provide for dynamic source determination of provisioning information on a per-network service basis for open market wireless devices. Specifically, systems, apparatus and methods provide for the open market wireless devices and/or the users of such devices to acquire provisioning information for network services in instances in which neither the removable module currently associated with the device or the non-removable memory of the open market wireless device store the provisioning information for the desired network service. Thus, the user of the open market wireless device is able to acquire and configure provisioning information for newly offered or otherwise previously unavailable network services in a convenient and efficient manner, thereby eliminating the need to replace or update existing removable modules.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
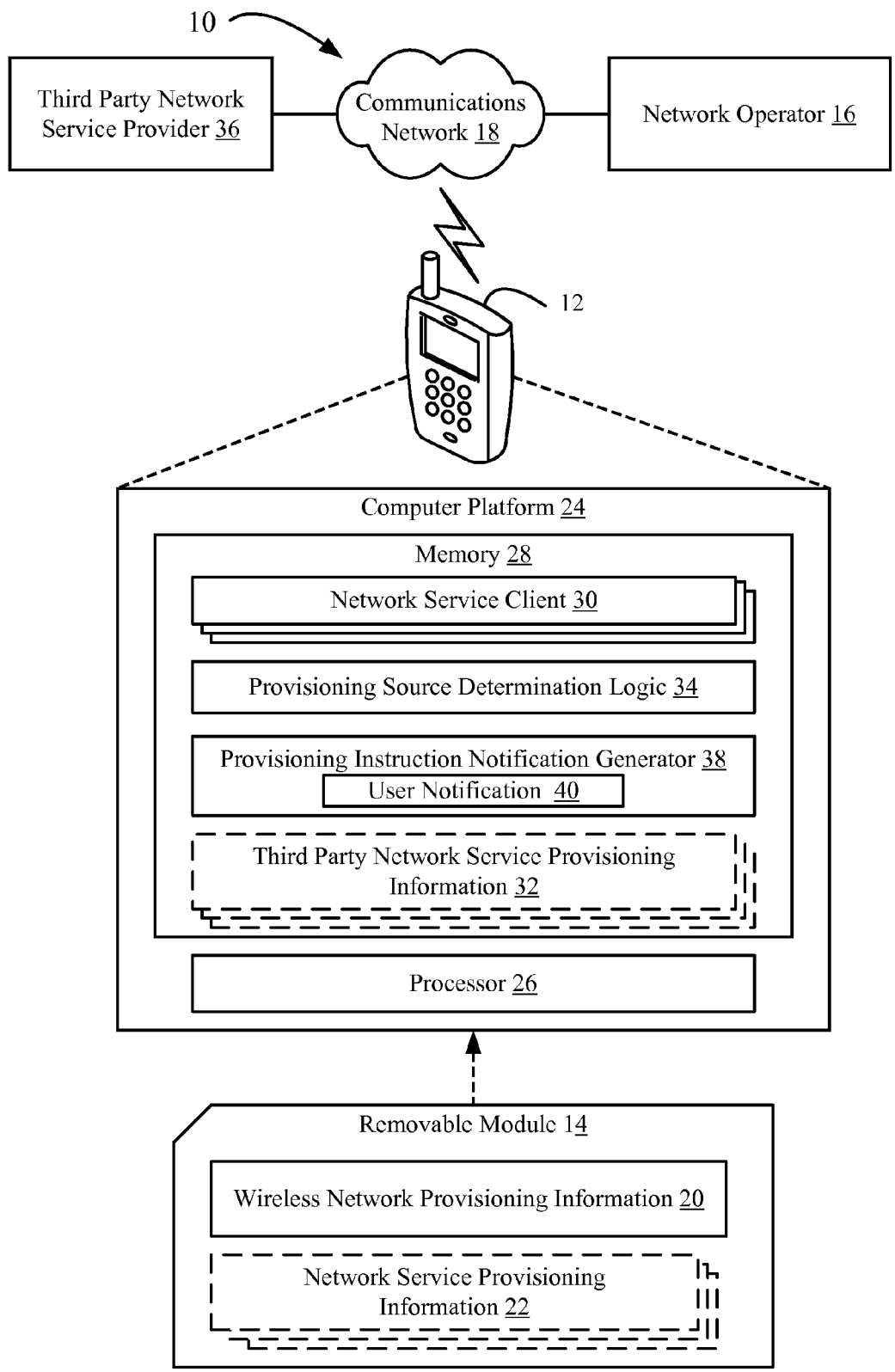
FIG. 1 is a schematic diagram of one aspect of a system for determining a source for provisioning information on an open market wireless device and proxying needs at a network operator.

The present devices, apparatus, methods, computer-readable media and process ors now will be described more fully hereinafter with reference to the accompanying drawings, in which aspects of the innovation are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the innovation to those skilled in the art. Like numeric designators in the figures and the detailed description refer to like elements throughout.

The various aspects are described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Present aspects herein disclose apparatus, methods and systems that provide for dynamic source determination of provisioning information on a per-network service basis for open market wireless devices. Specifically, systems, apparatus and methods provide for the open market wireless devices and/or the users of such devices to acquire provisioning information for network services in instances in which neither the removable module currently associated with the device or the non-removable memory of the open market wireless device store the provisioning information for the desired network service. In this regard, present aspects provide for a prompt, such as a user notification to be presented on an output mechanism of the wireless device when the wireless determines first that the provisioning information is not stored on the removable module and, secondly, that the provisioning information is not stored on the non-removable data storage of the device. In one aspect, the user notification may provide instructions for obtaining the provisioning information and manually entering (i.e., storing) the provisioning information on the wireless device. In another aspect, the user notification may provide instructions for obtaining and storing the provisioning automatically via the wireless communication network, such as downloading the provisioning information from a network server or the like.

The term "removable module" is used herein to refer to any module that may be inserted or otherwise in communication with a wireless device and provides for storage of information, such as wireless service provisioning information and/or network service provisioning information. This, "removable module" may include, but is not limited to, a Removable User Identity Module (RUIM) for a Code Division Multiple Access (CDMA) system, a CDMA Subscriber Identity Module (CSIM) based on a Universal Integrated Circuit Card (UICC) for a CDMA system, Universal Subscriber Identity Module (USIM) based on a UICC for Universal Mobile Telecommunications System (UMTS), or a Subscriber Identity Module (SIM) in a Global System for Mobile communications (GSM) system or the like.

Referring to FIG. 1, a schematic diagram is provided of a system 10 for determining and obtaining network service provisioning information, according to aspects herein disclosed. The system includes an open market wireless device 12 and an associated removable module 14 that is provisioned and provided by network operator 16 to allow the wireless device to communicate on wireless communication network 18. The removable module is characteristically inserted or otherwise in temporal communication with the wireless device 12 to provide the open wireless device 12 with the requisite wireless network provisioning information 20 needed for the open market wireless device 12 to communicate across wireless communication network 18. Additionally, the removable module may, optionally, be configured by network operator 16 with network service provisioning information 22 that is operable to provide the wireless device access to an associated network services provided by the network operator 16 or otherwise accessible through the network operator.

The open market wireless device 12 includes a computer platform 24 having at least one processor 26 and memory 28. The memory 28 of open market wireless device 12 includes one or more network service clients 30, which may include a download network service client, such as BREW® or any other network service client. The network services associated with clients 30 may be provided by the network operator 16 or otherwise accessible via the network operator. Alternatively, the network services may additionally or exclusively be provided by a third party network service provider 36, such as Original Equipment Manufacturer (OEM) network service provider or the like. A third party network service provider 36 as herein defined includes any service provider other than the network operator. Thus, the memory 28 of open market wireless device 12 may, optionally, include third party network service provisioning information 32 that is operable to provide the wireless device 12 access to an associated network service provided by the third party. It should be noted that in certain aspects the removable module may be configured without network service provisioning information 22 and/or the device 12 may be configured without third party service provisioning information 32. Such configuration is allowable in accordance with present aspects which serve to provide a source for provisioning information in instances in which the provisioning information for a selected network service is determined to be neither stored or the removable module 14 or a non-removable data storage of memory 28

The memory 28 of open market wireless device 12 additionally includes network service provisioning source determination logic 34 operable to dynamically determine a source for network service provisioning information upon receiving a command for initiating the launch of a network service client 30 on the wireless device 12. Thus, network service provisioning source determination logic 34 is able to determine a source for provisioning information dynamically; on a per-network service basis each time an input is received for initiating a network service client 30 as opposed to statically determining a source for provisioning information for all network services at compile-time or during start-up. While network service provisioning source determination logic 34 is shown in FIG. 1 and described as being in memory 28 it may also possible, and is within the bounds of present aspects, to provide for logic 34 as a subsystem of processor 26. The network service provisioning source determination logic 34 is configured to first determine if the removable module 14 includes the network service provisioning information 22 associated with the network service being launched. If the corresponding network service provisioning information 22 for the service being launched is determined to be stored on the removable module 14, then the service is launched using network service provisioning information 22. If the removable module 14 does not include the provisioning information for the requested network service, then network service provisioning source determination logic 34 determines if the memory 28 of network device 12 includes third party network service provisioning information 32 corresponding to the network service being launched and, if the memory 28 includes the associated network service provisioning information 32, then the service is launched using the corresponding third party network service provisioning information 32.

In accordance with aspects of the present innovation, memory 28 of open market wireless device 12 includes provisioning instruction notification generator 38 operable to generate a user notification 40 that is output on the wireless device 12, if provisioning information is not determined to be stored on either the removable module 14 or any non-removable data storage of memory 28. In some aspects, the user notification 40 may take the form of a prompt displayed on the wireless device. It is also possible for the user notification to be an audible notification outputted via a speaker or other audio output mechanism. In some aspects, the instructions in the user notification 40 for obtaining the provisioning information, such as a web address or other source for obtaining the provisioning information. The web address may provide for a hyperlink for automatic access by those wireless devices configured to provide Internet access or the web address may allow the user to obtain the information using another Internet-accessible device. Once the user of the wireless device 12 obtains the provisioning information from the source, such as obtaining the provisioning information from a webpage, the user may manually enter the provisioning information into wireless device memory 28. Alternatively, the web page may be configured to automatically upload the provisioning information to the wireless device. In other aspects, the instructions in the user notification 40 for obtaining the provisioning information may provide for a link or some other similar mechanisms within the user notification 40 to automatically download the provisioning information to the open market wireless device.

It should also be noted that once the provisioning information is obtained via the instructions in the user notification 40, either manually obtained from a source and manually entered in, downloaded from a network source, uploaded from a network source or the like, the provisioning information may be stored in a non-removable data storage of memory 28. Alternatively, in those aspects in which the removable module 14 is not limited to read-only type memory, the provisioning instructions may be stored, solely or in to addition wireless device storage, on the removable module 14

Figure 2:
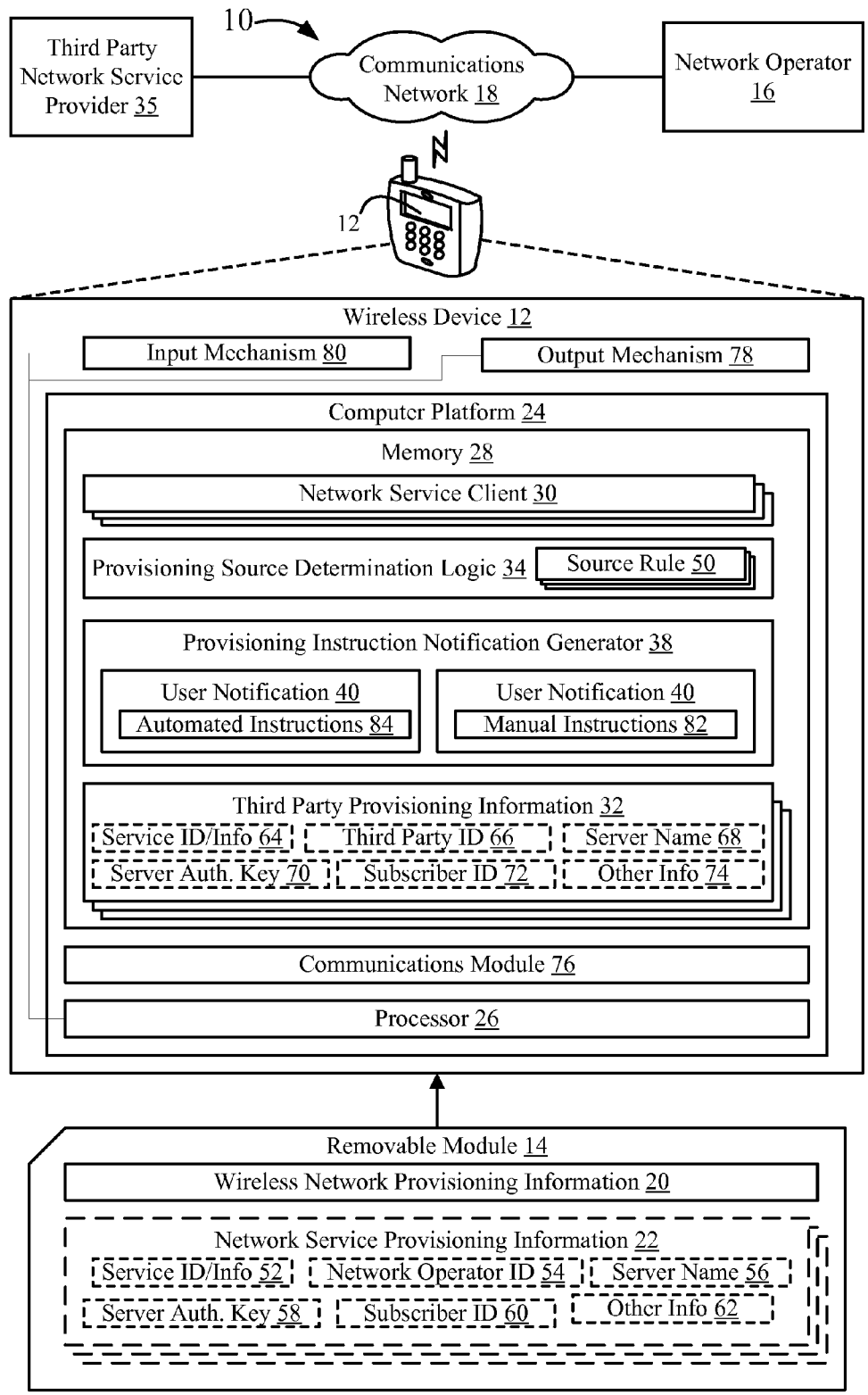
FIG. 2 is a schematic diagram of an open market wireless device for determining a source for provisioning information, according to another aspect.

FIG. 2 provides for another more detailed aspect of system 10, specifically highlighting detailed and optional aspects of the open market wireless device 12 and associated removable module 14. As previously described, system 10 includes an open market wireless device 12 operating on a communications network 18 under control of a network operator 16.

The memory 28 of wireless device 12 includes one or more network service clients 30 operable to launch the associated network service on the wireless device and provisioning source determination logic 34 operable to determine if either the removable module 14 or the device memory 28 store the provisioning information necessary to launch a network service corresponding a network service client 30. The provisioning source determination logic 34 may include one or more provisioning source rules 50 that are used to determine the source of the provisioning information. The source rule 50 that is applied to a particular network service client 30 defines where the client can look for provisioning information. For example, a source rule may provide for provisioning information to only come from the removable module (i.e., not allowed to be provided by the wireless device memory or user/manual input), another rule may provide for the provisioning information to come from the removable module or the wireless device memory but not user/manual input.

According to present aspects herein described, the provisioning rule 50 may provide for the device to look to the removable module 14 first for provisioning information 22 and, if provisioning information 22 is not found on the removable module 14, looks to device memory 28 for the provisioning information 32. According to the rule 50 of the present aspects, if provisioning information is not found on either the removable module 14 or the device memory, the logic 34 triggers the provisioning instruction notification generator 38 to generate a user notification 40 that provides the user with instructions for obtaining the provisioning information. Thus, network service provisioning source determination logic 34 via rule 50 is able to determine a source for provisioning information dynamically, on a per-network service (i.e., per-feature) basis, each time an input is received for initiating a network service client 30 as opposed to statically determining a source for provisioning information for all network services at compile-time or during start-up.

While source rules 50 are shown and described as being included within provisioning source determination logic 34, a rule 50 or a rule identifier may be included within a client 30, such that the client defines which of the provisioning source rules are applicable in attempting to launch the network service. Alternatively, according to open market handset industry standards, the wireless device may be pre-programmed such that device dictates which of the rules will be applied to all or specific network service clients 30.

As shown the provisioning instruction notification generator 38 may generate a user notification 40 to notify the user via output mechanism 78 that provisioning information is unavailable for the network service requested and providing instructions for how to obtain the provisioning information. While FIG. 2 depicts provisioning instruction notification generator 38 as being stored in memory 28, in alternate aspects the generator 38 may exist as a subsystem of processor 26. In one aspect the user notification 40 may include manual instructions 82, such as web address or the like, which require the user to user manually obtain the provisioning information from a designated source. The designated source may further provide for manual entry of the provisioning information or, alternatively, automated entry of the provisioning information, such as uploading the provisioning information to the wireless device from a network site or the like. In other aspects, the user notification 40 may include automated instructions 84, such as a download link or the like, operable to automatically obtain the necessary provisioning information via the wireless network 18.

As previously noted, the removable module 14 may include provisioning information 22 for one or more network services that provides necessary information for accessing the service. In most aspects, provisioning information 22 will be associated with a network service provided for by the removable module—issuing network operator and accessible through the removable module—issuing network operator. Provisioning information 22 may include network service identifier/network service information 52, network operator identifier 54, server name 56, server authorization key 58, subscriber identifier 60 or other provisioning information 62, such as Domain Name Server (DNS) look-up identifier or the like.

Additionally, as previously noted, the memory 28 of the wireless device 12 may include third party provisioning information 32 that provides the necessary information for accessing the service. Similar to provisioning information 22 stored on the removable module 14, provisioning information 32 may include network service identifier/network service information 64, third party service provider identifier 66, server name 68, server authorization key 70, subscriber identifier 72 or other provisioning information 74, such as Domain Name Server (DNS) look-up identifier or the like. As previously noted in certain aspects, the removable module 14 may not be configured with provisioning information 22 and/or the memory 28 of wireless device may not be configured with any third party provisioning information 32.

The provisioning information obtained by the user and/or wireless device based on the instructions in the user notification 40 may include one or any combination of the network service provisioning information 22, such as service identifier/network service information 52, network operator identifier 54, server name 56, server authorization key 58, subscriber identifier 60 or other provisioning information 62 and/or the third party provisioning information 32, such as network service identifier/network service information 64, third party service provider identifier 66, server name 68, server authorization key 70, subscriber identifier 72 or other provisioning information 74 or the like.

The wireless device 12 includes a communication module 76 operable to provide for internal communications within the wireless device 12 and external communications with the associated removable module 14. The communications module 76 also is operable to provide for wireless communication with the wireless network designated in the wireless network provisioning information 20 stored on the removable module 14. Additionally, the communications module is operable to communicate network service launch requests 78 to either the network operator service provider 16 or a designated third party network service provider 30 depending on which provisioning information is used to launch the service. In some aspect, the communications module may operable to receive downloads of provisioning information from network entities based on instructions provided in user notification 40.

Additionally, the wireless device 12 includes a plurality of output mechanism 78 and input mechanism 80 in communication with processor 26. As previously noted, in one aspect, output mechanisms 78 may include any mechanism suitable for outputting user notification 40, such as a display, a speaker, a video output, an audio output or the like. In some aspects, the input mechanisms 80 may include any mechanism suitable for receiving a user input to launch a network service, such as a keypad, button, touch-screen, mouse or the like.

Figure 3:
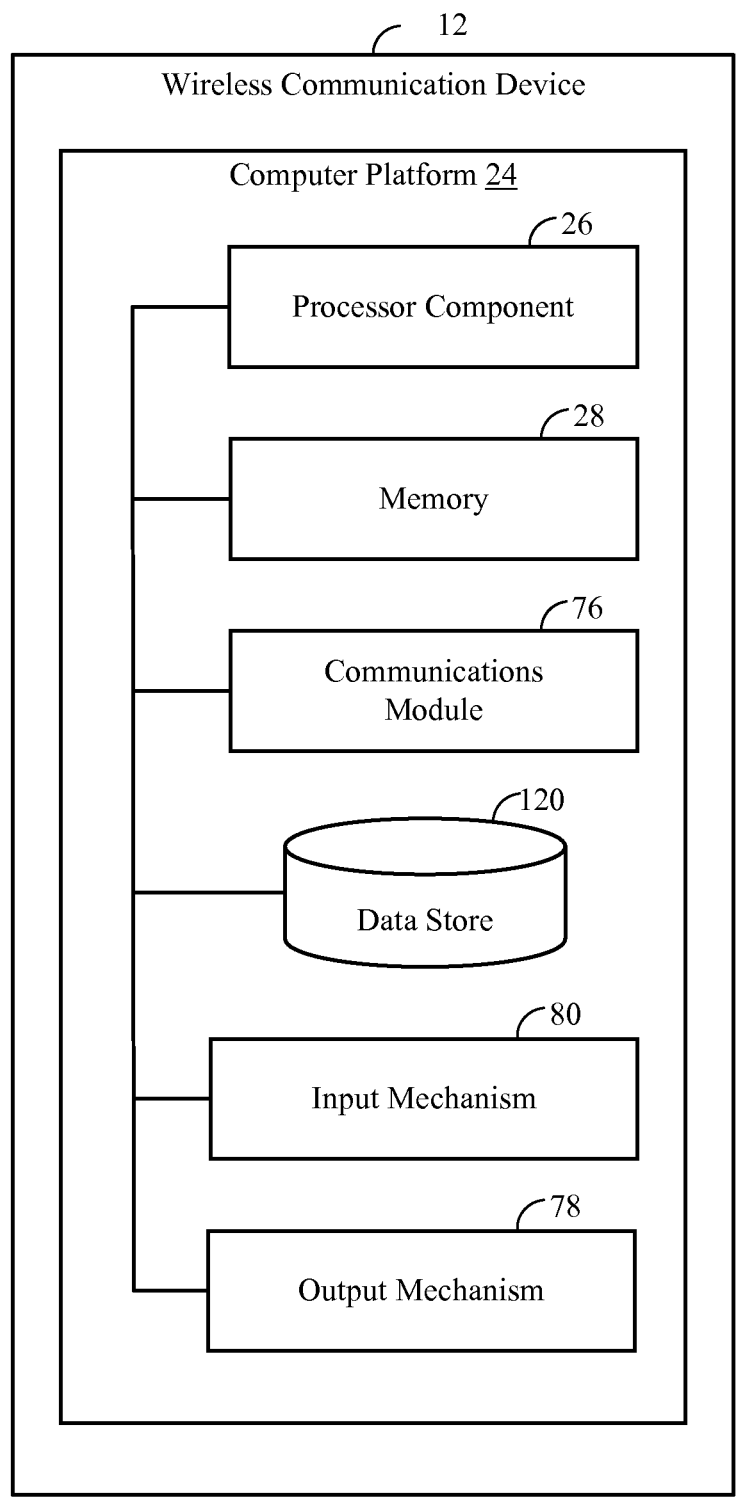
FIG. 3 is schematic diagram of one aspect of a wireless communication device operable as described herein.

Referring to FIG. 3, in one aspect, open market wireless communications device 12 includes a mobile communication device, such as mobile telephone or the like, operable on a wireless communication system. As can be appreciated, there are a variety of wireless communication systems, which often employ different spectrum bandwidths and/or different air interface technologies. Exemplary systems include CDMA (CDMA 2000, EV DO, WCDMA), OFDM, or OFDMA (Flash-OFDM, 802.20, WiMAX), FDMA/TDMA (GSM) systems using FDD or TDD licensed spectrums, peer-to-peer (e.g., mobile-to-mobile) ad hoc network systems often using unpaired unlicensed spectrums, and 802.xx wireless LAN or BLUETOOTH techniques.

As previously noted, wireless communications device 12 includes processor component 26 for carrying out processing functions associated with one or more of components and functions described herein. Processor component 26 can include a single or multiple set of processors or multi-core processors. Moreover, processing component 26 can be implemented as an integrated processing system and/or a distributed processing system. Additionally, processing component 26 may include one or more processing subsystems, such as processing subsystems capable of determining provisioning information source according to present aspects, determining geographic location, such as GPS or the like or any other processing subsystem needed to carry out present aspects.

Wireless communications device 12 further includes a memory 28, such as for storing local versions of applications/modules being executed by processor component 26. Memory 28 can include random access memory (RAM), read only memory (ROM), and a combination thereof. Additionally, in some aspects (not shown in FIG. 4), memory 28 includes network service clients 30, provisioning source determination logic 34, third party provisioning information 32 and/or provisioning instruction notification generator 38.

Further, wireless communications device 12 includes a communications module 76 that provides for establishing and maintaining communications with one or more parties utilizing hardware, software, and services as described herein. Communications module 76 may carry communications between components on wireless communications device 12, as well as between wireless communications device 12 and external network devices, such as devices under the control of network operator 16 or third party network service provider 36, located across a communications network and/or devices serially or locally connected to wireless communications device 12, such as removable module 14.

Additionally, wireless communications device 12 may further include a data store 120, which can be any suitable combination of hardware and/or software that provides for mass storage of information, databases, and programs employed in connection with aspects described herein. Optionally, in some aspects, (not shown in FIG. 3) data store 120 may include network service clients 30, provisioning source determination logic 34, third party provisioning information 32 and/or provisioning instruction notification generator 38.

Wireless communications device 12 may additionally include a user interface component, such as input mechanism 80 operable to receive inputs from a user of wireless communications device 12, and output mechanisms 78 operable to generate outputs for presentation to the user. Input mechanism 80 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. In particular, input mechanism 80, may include a component suitable for initiating the launch of network service clients 30. Further, output mechanism 78 may include one or more output devices, including but not limited to a display, a speaker, a haptic feedback mechanism, a printer, any other mechanism capable of presenting an output to a user, or any combination thereof. In particular, output mechanism 78, may include a component suitable for outputting the user notification 40

Figure 4:
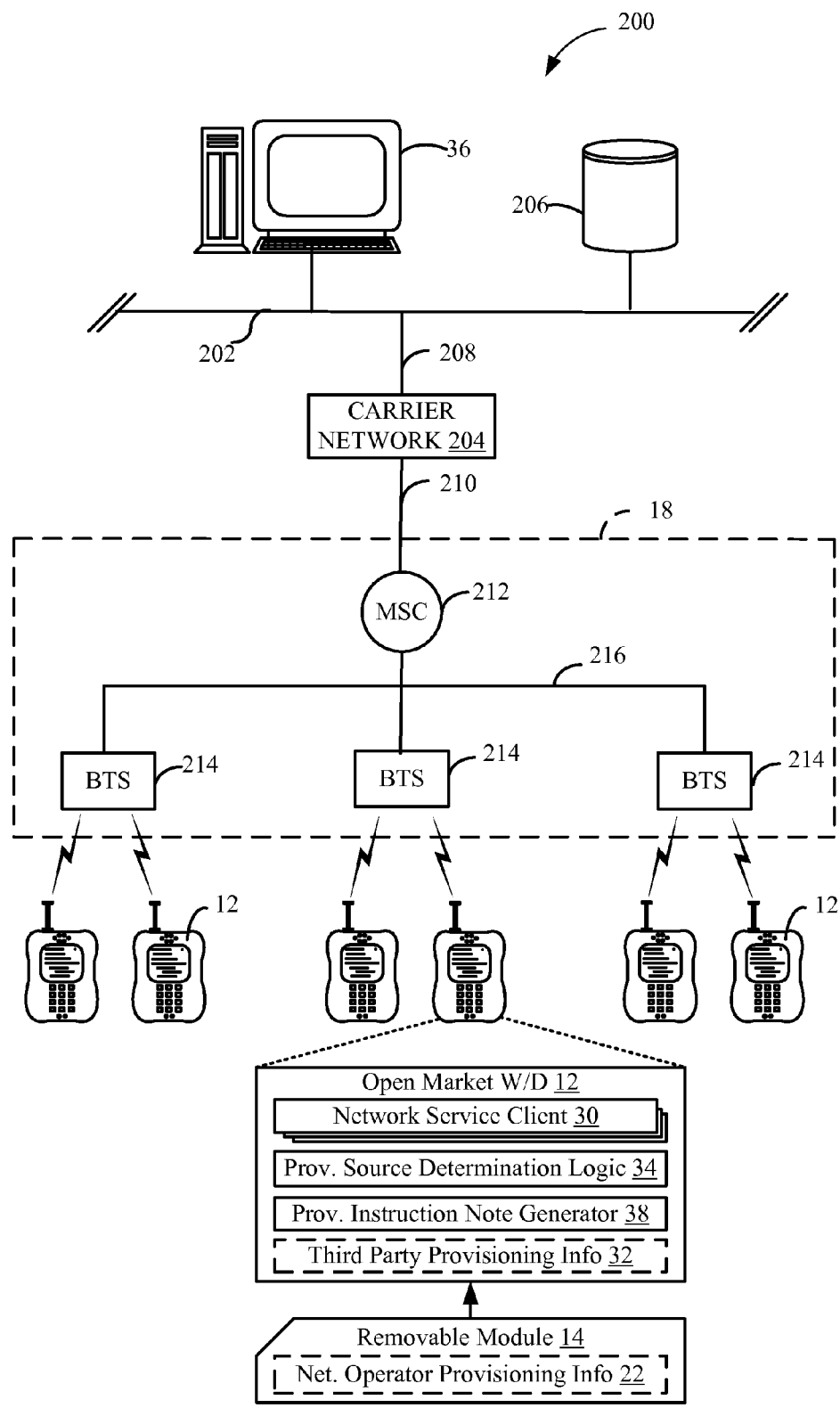
FIG. 4 is a schematic diagram of a wireless network, specifically a cellular network used in conjunction with present aspects.

FIG. 4 represents a block diagram of a cellular network 200, which may be used in conjunction with present aspects to communicate wireless messages. A wireless network 18 may be included within cellular network 200 and, as such may be implemented to communicate the device identification messages from the wireless devices/removable modules to the network operator and the device identification request messages from the network operator to the wireless devices/removable modules. Referring to FIG. 4, in one aspect, open market wireless device 12 comprise a wireless communication device, such as a cellular telephone. In present aspects, wireless communication devices are configured to communicate via the cellular network 200. The cellular network 200 provides wireless communication device 12 the capability to communicate communication data packets, such as SMS data packets or other messaging data packets. The cellular telephone network 200 may include wireless network 18 connected to a wired network 202 via a carrier network 204. FIG. 4 is a representative diagram that more fully illustrates the components of a wireless communication network and the interrelation of the elements of one aspect of the present system. Cellular telephone network 200 is merely exemplary and can include any system whereby remote modules, such as wireless communication devices 12 communicate over-the-air between and among each other and/or between and among components of a wireless network 18, including, without limitation, wireless network carriers and/or servers.

In network 200, network device 36, such as a network server, can be in communication over a wired network 202 (e.g. a local area network, LAN). Further, a network database/storage device 206 may be in communication with network device 36 via the wired network 202. Network device 36 may receive and/or generate and communicate communication data packets, such as SMS message data packets to and from the open market wireless devices 12. Network device 36 and database 206 may be present on the cellular telephone network 200 with any other network components that are needed to provide cellular telecommunication services. Network device 36 and database 206 communicate with carrier network 204 through a data links 208 and 210, which may be data links such as the Internet, a secure LAN, WAN, or other network. Carrier network 204 controls messages (generally being data packets) sent to a mobile switching center ("MSC") 212. Further, carrier network 204 communicates with MSC 212 by a network 210, such as the Internet, and/or POTS ("plain old telephone service"). Typically, in network 210, a network or Internet portion transfers data, and the POTS portion transfers voice information. MSC 212 may be connected to multiple base stations ("BTS") 214 by another network 216, such as a data network and/or Internet portion for data transfer and a POTS portion for voice information. BTS 214 ultimately broadcasts messages wirelessly to the wireless communication devices 12, by short messaging service ("SMS"), or other over-the-air methods.

Figure 5:
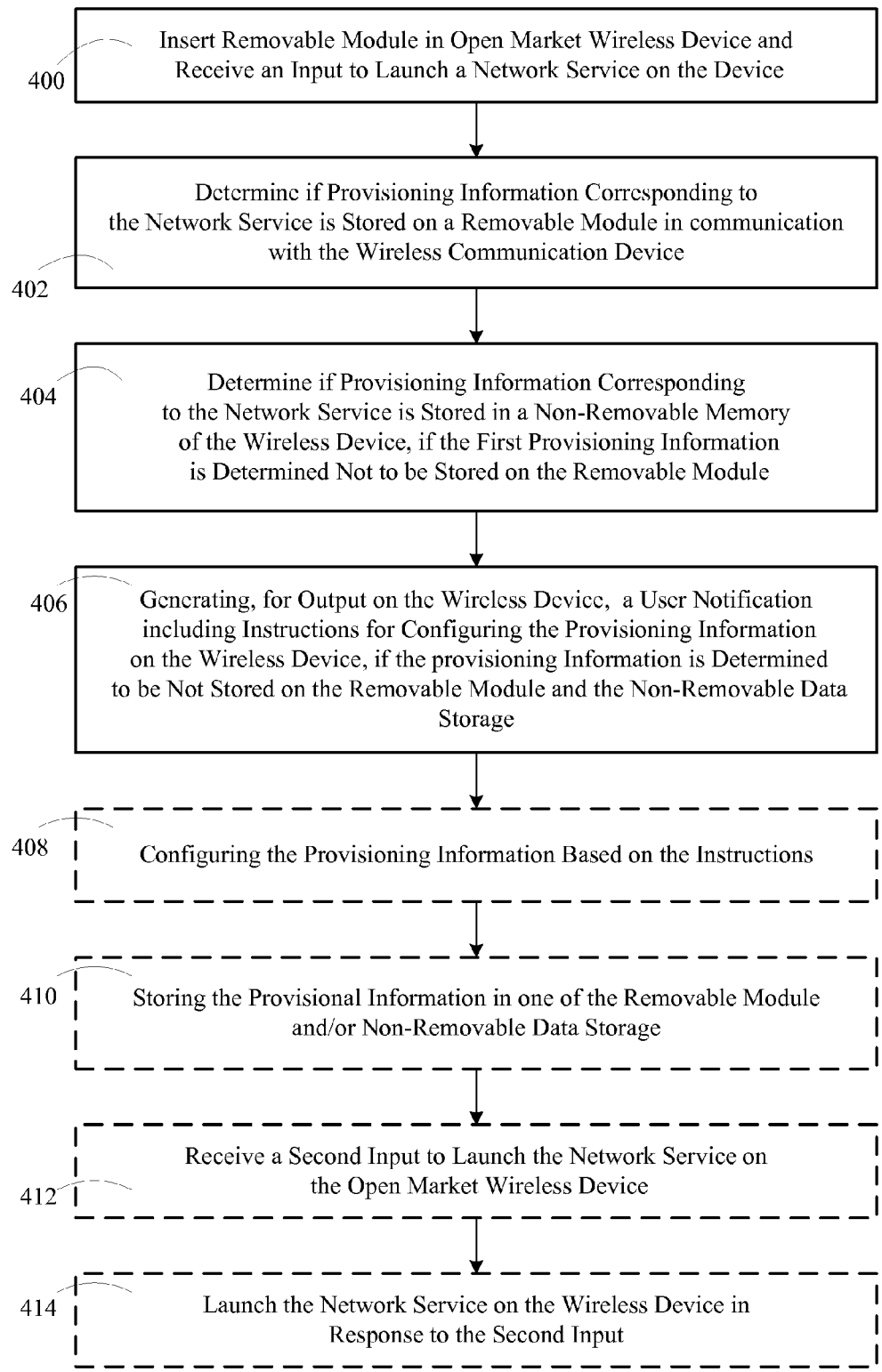
FIG. 5 is a flow diagram depicting a method for dynamic source determination of provisioning information on a per-network service basis for open market wireless devices, according to aspects herein described.

Referring to FIG. 5, a flow diagram is depicted of a methodology for determining a source for network service provisioning information in an open market wireless device, in accordance with an aspect of the present innovation. At Event 400, a removable module is inserted or otherwise placed in communication with an open market wireless communication device. The removable module includes configuration to enable the removable module to communicate with a wireless network in control of the network operator and may additionally include provisioning information for one or more network services. Additionally, the open market wireless device receives an input, such an input by a user to a designated input mechanism, to launch a chosen network service, such as a download network service, for example BREW® or the like.

At Event 402, the wireless device determines if provisioning information for the chosen network service is stored on the removable module. In most aspects, the network service provisioning information stored on the removable module will be associated with a network operator provided network service. As such, the network service provisioning information stored on the removable module will provide for the wireless device to access a network operator server to initiate the launch of the service on the wireless device.

If the wireless device determines that no provisioning information exists on the removable module for the chosen network service then, at Event 404, the wireless device determines if provisioning information for the chosen network service is stored on the non-removable memory of the wireless device. In most aspects, the network service information stored on the non-removable data storage of the open market wireless device will be associated with a third party network service provider (i.e. a service provider other than the network operator), such as the OEM of the wireless device or the like.

If the wireless device determines that no provisioning information exists on the non-removable memory of the wireless device and the removable module then, at Event 406, a user notification is generated for output on the open market wireless device. In most aspects, the user notification is outputted on a wireless device display, although other output mechanisms, such as a speaker or the like may output the user notification. The user notification is operable to notify the user that provisioning information is currently not stored on the removable module or device memory and, further, instructions for obtaining the provisioning information.

As previously noted the instructions provided in the user notification for obtaining the provisioning information may be instructions for manually obtaining the provisioning information, such as a network site (e.g., a web address or the like) or the instructions may provided for automatically obtaining the provisioning information via wirelessly downloading of the provisioning information from a predetermined network entity. Thus, at optional Event 408, the provisioning information is configured on the open market wireless device based on the instructions in the user notification. In the manual aspect in which the source is a web page or the like, the user may access the web page from the wireless device, if the device is configured for Internet or other similar network-type access or the user may access the web page from another device configured such network access. Once the user has located the provisioning information at the source, such as at the webpage, the user may then manually enter the provisioning information into the memory of the wireless device or the web page may be configurable to upload the provisioning information to the wireless device. In the automated aspect, configuring the provisioning information may provide for the user to make the requisite input to initiate downloading and storing of the provisioning information on the wireless device.

At Event 410, the provisioning information is stored in at least one of the non-removable data storage of the wireless device or the removable module. In most aspects, storage is limited to the non-removable data storage of the wireless device, since most removable modules are configured to provide for read-only memory. However, if the removable module is configured such that user storage of data is possible, the provisioning information may be stored on the removable module or stored in both the non-removable data storage of the wireless device and the removable module.

At Event 412, a second input is received to launch the network service on the open market wireless device. The second input may be the same input as the first input or if the device is configured to receive different inputs to launch the network service, the second input may differ from the first input according to the configuration. At Event 414, the network service is launched by determining that the provisioning information is stored in the non-removable storage of the wireless device or, in some aspects as discussed above, the removable module and using the provisioning information to properly launch the network service on the wireless device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, presently described aspects define systems, apparatus and methods that provide for dynamic source determination of provisioning information on a per-network service basis for open market wireless devices. Specifically, systems, apparatus and methods provide for the open market wireless devices and/or the users of such devices to acquire provisioning information for network services in instances in which neither the removable module currently associated with the device or the non-removable memory of the open market wireless device store the provisioning information for the desired network service. In this regard, present aspects provide for a prompt, such as a user notification to presented on an output mechanism of the wireless device when the wireless determines first that the provisioning information is not stored on the removable module and, secondly, that the provisioning information is not stored on the non-removable data storage of the device. In one aspect, the user notification may provide instructions for obtaining the provisioning information and manually entering (i.e., storing) the provisioning information on the wireless device. In another aspect, the user notification may provide instructions for obtaining and storing the provisioning automatically via the wireless communication network, such as downloading the provisioning information from a network server or the like.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of dynamic source determination of provisioning information on an open market wireless communication device, comprising:
   receiving a first input to launch a network service on an open market wireless communication device;
   determining if provisioning information corresponding to the network service is stored on a removable module in communication with the wireless communication device;
   if the provisioning information is determined to be not stored on the removable module, determining if provisioning information corresponding to the network service is stored on a non-removable data storage of the wireless device; and
   if the provisioning information is determined to be not stored on the removable module and the non-removable data storage, generating a user notification for output on the wireless communication device, wherein the user notification includes instructions for configuring the provisioning information on the wireless communication device.

2. The method of claim 1, wherein generating the user notification further comprises generating the user notification, wherein the user notification includes instructions for obtaining provisioning information that is to be manually entered on the wireless communication device.

3. The method of claim 2, wherein generating the user notification further comprises generating the user notification, wherein the user notification includes an address for an Internet-based webpage that provides provisioning information to be manually entered on the wireless communication device.

4. The method of claim 2, wherein generating the user notification further comprises generating the user notification, wherein the user notification includes instructions for wireless network delivery of the provisioning information to the wireless communication device.

5. The method of claim 4, further comprising receiving a second input to initiate the wireless network delivery of the provisioning information based on the instructions included in the user notification.

6. The method of claim 1, further comprising:
   receiving the provisioning information based on the instructions;
   storing the provisioning information in at least one of the removable module or the non-removable data storage;

receiving a second input to launch the network service on the wireless communication device; and launching the network service on the wireless communication device in response to the second input.

7. The method of claim 6, wherein receiving a second input further comprises:

checking for a service provisioning indicator corresponding to the network service, prior to determining if the provisioning information corresponding to the service is stored on the removable module, wherein the service provisioning indicator indicates that the provisioning information is not stored on the removable module; and retrieving the provisioning information from the non-removable data storage if the service provisioning indicator is detected.

8. The method of claim 7, wherein launching the network service on the wireless communication device further comprises launching the network service on the wireless communication device according to the provisioning information retrieved from the non-removable data storage.

9. The method of claim 1, wherein determining if provisioning information corresponding to the network service is stored on the removable module further comprises determining if the removable module is structured to support storage of provisioning information.

10. The method of claim 9, wherein if the provisioning information is determined to be not stored on the removable module, determining further comprises if provisioning information is determined to be not stored on the removable module or the removable module is determined to not be structured to support storage of the provisioning information, determining if provisioning information corresponding to the network service is stored on the non-removable data storage of the wireless communication device.

11. The method of claim 10, wherein if the provisioning information is determined to be not stored on the removable module and the non-removable data storage, generating further comprises if provisioning information is determined to be not stored on the removable module or the removable module is determined to not be structured to support storage of the provisioning information and not stored on the non-removable data storage, then generating the user notification for output on the wireless communication device.

12. The method of claim 1, determining if provisioning information corresponding to the network service is stored on the removable module further comprises determining, only if the wireless communication device is a non-legacy wireless communication device, if the provisioning information corresponding to the network service is stored on the removable module.

13. The method of claim 1, wherein the method for source determination is one of a plurality of methods implemented on the open market wireless device and pre-configuration of the open market wireless device dictates which source determination method is implemented.

14. The method of claim 1, wherein the method for source determination is one of a plurality of methods implemented on the open market wireless device and each network service operable on the open market wireless device dictates which source determination method is implemented.

15. At least one processor configured to provide source determination of provisioning information on an open market wireless communication device, comprising:

a first module for receiving a first input to launch a network service on an open market wireless communication device;

a second module for determining if provisioning information corresponding to the network service is stored on a removable module in communication with the wireless communication device, if the provisioning information is determined to be not stored on the removable module, determining if provisioning information corresponding to the network service is stored on a non-removable data storage of the wireless communication device; and a third module for generating a user notification for output on the wireless communication device, wherein the user notification includes instructions for configuring the provisioning information on the wireless communication device, if the provisioning information is determined to be not stored on the removable module and the non-removable data storage.

16. A computer program product, comprising:

a non-transitory computer-readable medium comprising:

a first set of codes for causing a computer to receive a first input to launch a network service on an open market wireless communication device;

a second set of codes for causing the computer to determine if provisioning information corresponding to the network service is stored on a removable module in communication with the wireless communication device-et, if the provisioning information is determined to be not stored on the removable module, determining if provisioning information corresponding to the network service is stored on a non-removable data storage of the wireless communication device; and a third set of codes for causing the computer to generate a user notification for output on the wireless communication device, wherein the user notification includes instructions for configuring the provisioning information on the wireless communication device, if the provisioning information is determined to be not stored on the removable module and the non-removable data storage.

17. An apparatus for source determination of provisioning information on a wireless communication device, comprising:

means for receiving a first input to launch a network service on an open market wireless communication device;

means for determining if provisioning information corresponding to the network service is stored on a removable module in communication with the wireless communication device, if the provisioning information is determined to be not stored on the removable module, determining if provisioning information corresponding to the network service is stored on a non-removable data storage of the wireless communication device; and means for generating a user notification for output on the wireless communication device, wherein the user notification includes instructions for configuring the provisioning information on the wireless communication device, if the provisioning information is determined to be not stored on the removable module and the non-removable data storage.

18. An open market wireless communication device, comprising: a computer platform including a processor and non-removable data storage in communication with the processor; a removable module in communication with the processor and operable to store data; one or more network service clients executable by the processor and stored in the non-removable data storage; a first user interface in communication with the processor and operable to receive a first input to launch one of the network service clients on the open market wireless communication device; provisioning source determination logic stored in the non-removable data storage and executable by the processor, wherein the logic is responsive to the first input to execute a first source rule, wherein the first source rule is operable to determine if provisioning information corresponding to a network service is stored on the removable module, if the provisioning information is determined to be not stored on the removable module, determine if provisioning information corresponding to the network service is stored on the non-removable data storage of the wireless communication device; and a provisioning instruction notification generator stored in the non-removable data storage and executable by the processor, wherein the generator is operable to generate a user notification for output on the wireless communication device, in response to the logic determining according to the first source rule that the provisioning information is not stored on the removable module or the non-removable data storage, wherein the user notification includes instructions for configuring the provisioning information on the wireless communication device.

19. The device of claim 18, wherein the provisioning instruction notification generator is further operable to generate the user notification that includes instructions for obtaining provisioning information that is to be manually entered on the wireless communication device.

20. The device of claim 19, wherein the provisioning instruction notification generator is further operable to generate the user notification that includes an address for an Internet-based webpage that provides the provisioning information.

21. The device of claim 18, wherein the provisioning instruction notification generator is further operable to generate the user notification that includes instructions for wireless network delivery of the provisioning information to the wireless communication device.

22. The device of claim 21, further comprising a second user interface in communication with the processor and operable to receive a second input to initiate the wireless network delivery of the provisioning information based on the instructions included in the user notification.

23. The device of claim 18, further comprising a second user interface in communication with the processor and operable to receive a second input to manually enter the provisioning information into either the non-removable data storage or the removable module based on the instructions in the user notification.

24. The device of claim 18, wherein the provisioning source determination logic is further operable to check for a service provisioning indicator corresponding to the network service, prior to determining if the provisioning information corresponding to the service is stored on the removable module and retrieve the provisioning information from the non-removable data storage if the service provisioning indicator is detected, wherein the service provisioning indicator indicates that the provisioning information is stored on the non-removable data storage.

25. The device of claim 1, wherein the provisioning source determination logic is further operable to determine if the removable module is structured to support storage of provisioning information and, if provisioning information is determined to be not stored on the removable module or the removable module is determined to not be structured to support storage of the provisioning information, determine if provisioning information corresponding to the network service is stored on the non-removable data storage of the wireless communication device.

26. The device of claim 25, wherein the provisioning instruction notification generator is further operable to generate a user notification for output on the wireless communication device, in response to the logic determining that the removable module does not support storage of the provisioning information or the provisioning information is not stored on the removable module or the non-removable data storage.

27. The device of claim 18, wherein the provisioning source determination logic is further operable to determine, only if the wireless communication device is a non-legacy wireless communication device, if the provisioning information corresponding to the network service is stored on the removable module.

28. The device of claim 18, wherein the provisioning source determination logic further includes a second source rule, wherein the second source rule is operable to determine if provisioning information corresponding to the network service is stored on the removable module and, if the provisioning information is not stored on the removable module abort the launch of the network service.

29. The device of claim 28, wherein the provisioning source determination logic further includes a third source rule, wherein the third source rule is operable to determine if provisioning information corresponding to the network service is stored on the removable module and, if the provisioning information is not stored on the removable module, determine if the provisioning information is stored on the non-removable data storage of the wireless device and, if the provisioning information is determined to be not stored on either the removable module or the non-removable data storage abort the launch of the network service.

30. The device of claim 29, wherein the provisioning source determination logic is further operable to determine which source rule to apply to a network service launch attempt based on pre-configuration of the open market wireless device.

31. The device of claim 29, wherein the provisioning source determination logic is further operable to determine which source rule to apply to a network service launch attempt based on pre-configuration of the corresponding network service client.

* * * * *